(12) United States Patent
Hsieh et al.

(10) Patent No.: US 8,106,301 B2
(45) Date of Patent: Jan. 31, 2012

(54) CONNECTING MEMBER

(75) Inventors: Chung-Cheng Hsieh, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/882,572

(22) Filed: Sep. 15, 2010

(65) Prior Publication Data

US 2011/0275240 A1 Nov. 10, 2011

(30) Foreign Application Priority Data

May 6, 2010 (CN) .......................... 2010 1 0164517

(51) Int. Cl.
*H01B 7/00* (2006.01)
(52) U.S. Cl. ...................................................... 174/135

(58) Field of Classification Search .................... 174/69, 174/135; 439/502
See application file for complete search history.

(56) References Cited

U.S. PATENT DOCUMENTS

| | | | | |
|---|---|---|---|---|
| 2,143,649 A | * | 1/1939 | Dansard | 174/69 |
| 4,153,326 A | * | 5/1979 | Frantz et al. | 439/293 |
| 4,992,629 A | * | 2/1991 | Morais | 174/69 |
| 5,816,848 A | * | 10/1998 | Zimmerman | 439/502 |

* cited by examiner

*Primary Examiner* — Phuong Dinh
(74) *Attorney, Agent, or Firm* — Altis Law Group, Inc.

(57) ABSTRACT

A connecting member includes a cable configured to transfer signal, two securing members, and a resilient component. The two securing members secure the resilient component to the cable, the resilient component is elastically deformable between a first state, in which the resilient component and the cable are contracted, and a second state, in which the resilient component and the cable are extended.

8 Claims, 3 Drawing Sheets

CONNECTING MEMBER

CROSS-REFERENCE TO RELATED APPLICATIONS

This application are related to co-pending applications entitled, "CONNECTING MEMBER", filed on Sep. 15, 2010, application Ser. No. 12/882,602, and "CONNECTING MEMBER", filed on Oct. 8, 2010, application Ser. No. 12/900,663.

BACKGROUND

1. Technical Field

The present disclosure relates to a connecting member for connecting two electronic components of an electronic device.

2. Description of Related Art

Generally, a cable is configured for connecting electronic components, such as a hard disk drive, a motherboard, or an optical disk drive. The cable normally has a surplus portion when connected to the electronic components in order to assure the different distances between each component. The surplus portion of the cable takes up a lot of space, between the electronic components and can be disorderly placed in the electronic device.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
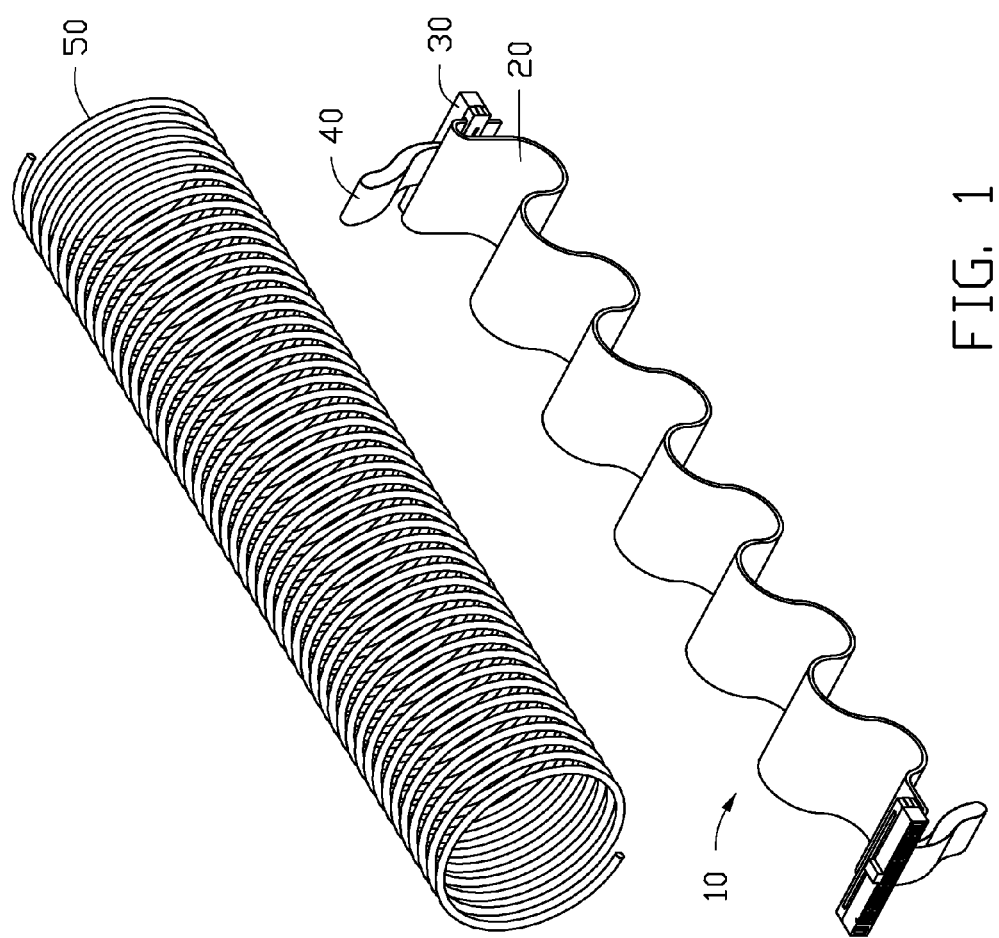
FIG. 1 is an exploded, isometric view of a connecting member in accordance with an embodiment.

Referring to FIG. 1, a connecting member in accordance with an embodiment includes a cable 10 and a resilient component 50.

The cable 10 is configured to connect two electronic components of an electronic device (not shown) and transfer signals between the two electronic components. The cable 10 includes a ribbon strip 20, two connectors 30 secured to the two ends of the ribbon strip 20, and two securing members 40. In one embodiment, the electronic device can be a computer, or a server. The electronic component can be a storage device, or a motherboard. The cable 10 can be a ribbon cable. The two securing members 40 are capable of being secured to the two connectors 30. In other embodiments, the two securing members 40 are capable of being secured to the ribbon strips 20. Each securing member 40 is substantially strap shaped.

Figure 2:
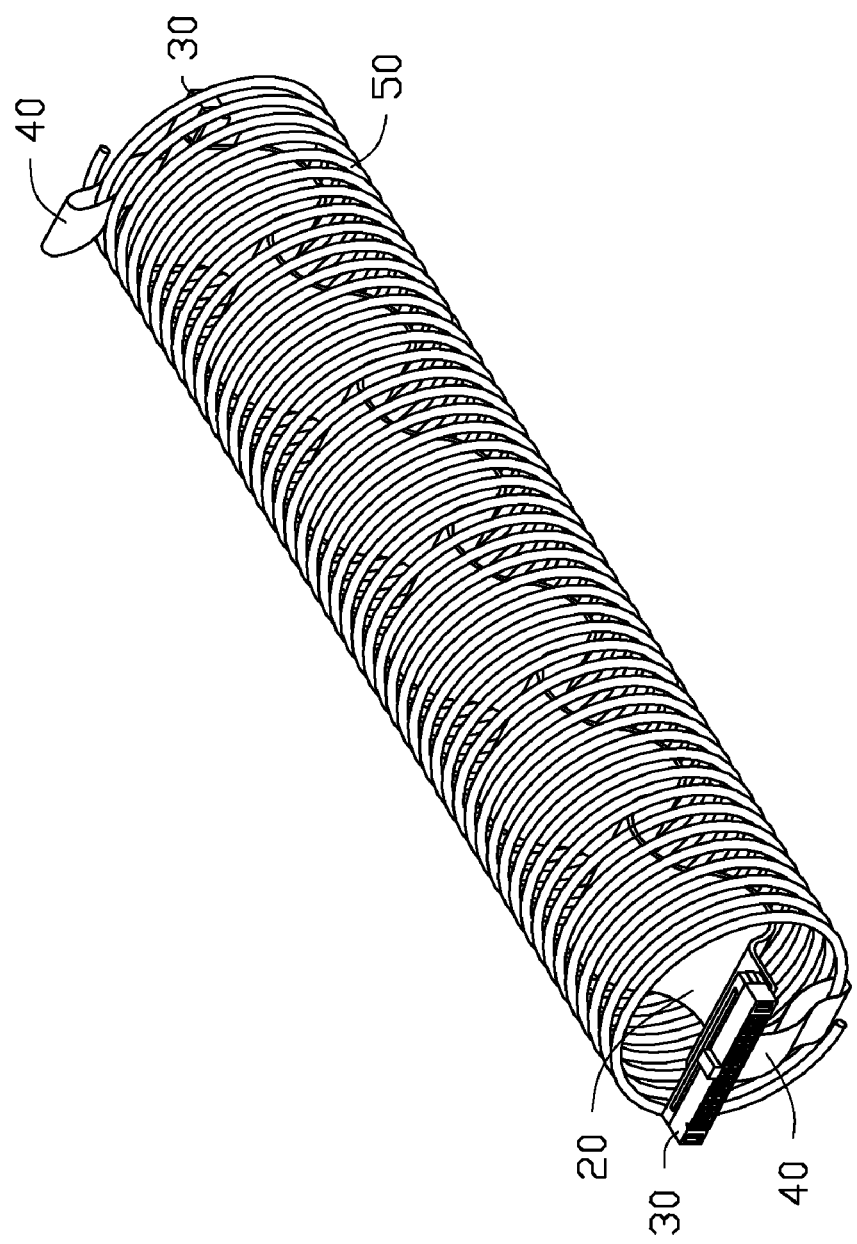
FIG. 2 is an assembled view of FIG. 1, showing the connecting member in a first state.
Figure 3:
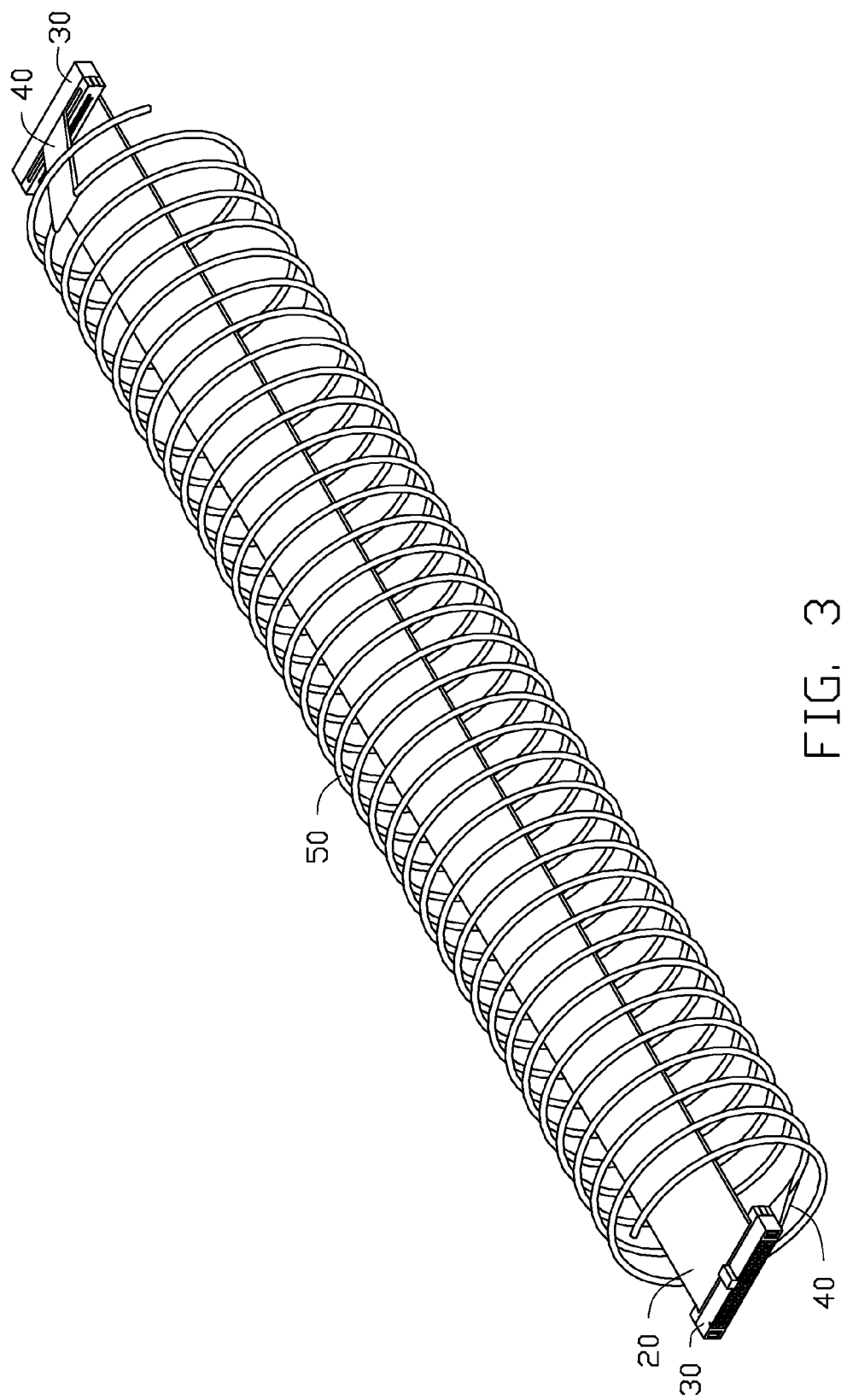
FIG. 3 is similar to FIG. 2, but shows the connecting member in a second state.

Referring to FIGS. 2 and 3, the resilient component 50 surrounds the cable 10 and is secured to the cable 10 by the two securing members 40. The resilient component 50 is elastically deformable between a first state and a second state. In the first state, the resilient component 50 and the ribbon strip 20 are constricted (shown in FIG. 2), and in the second state, the resilient component 50 and the ribbon strip 20 are extended together. In one embodiment, in the second state, the resilient component 50 is elastically stretched when the cable 10 is stretched, and a distance between the two connectors 30 are longer than a distance between the two connectors 30 in the first state. In one embodiment, the resilient component 50 is an extendable coil spring, the length of the two ends of the resilient component 50 in the first state is shorter than the length of cable 10, and the cable 10 is substantially received in the extendable coil spring.

In use, the two connectors 30 on the cable 10 are connected to two electronic components in a electronic device enclosure (not shown), such as a motherboard, a storage device. To test if the electronic component woks, the electronic component is removed from the electronic device enclosure, so the electronic component can be tested. At this time, the two connectors 30 are pulled apart in the opposite direction, and the ribbon strip 20 of the cable 10 is pulled straight and the resilient component 50 is elastically extended. When the electronic component is placed back in the electronic device enclosure, the resilient component 50 contracts, to urge the ribbon strip 20 of the cable 10 to contract as well. Thus, the cable 10 is capable of being contracted, and placed orderly between the two electronic components, reducing the space required in the electronic device.

In addition, the cable 10 is capable of stretching and constricting with the resilient component 50 that is sleeved about the cable 10. Therefore, the cable 10 is not easily damaged when the connectors 30 are connected to the electronic components. The cable 10 is placed orderly between the electronic components, and will not influence the air flow in the enclosure.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A connecting member comprising:
   a cable configured to transfer signal;
   two securing members extending from two ends of the cable, each of the two securing members being strip-shaped; and
   an resilient component, two ends of the resilient component are adapted to be clipped to the two securing members to engage the resilient component to the cable; wherein the resilient component is elastically deformable between a first state, in which the resilient component and the cable are contracted, and a second state, in which the resilient component and the cable are extended.

2. The connecting member of claim 1, wherein the cable comprises a ribbon strip and two connectors configured to be electronically connected to two electronic components, and the two connectors are electronically connected to the ribbon strip.

3. The connecting member of claim 2, wherein the two connectors are connected to two ends of the ribbon strip.

4. The connecting member of claim 2, wherein the two securing members are secured to the two connectors.

5. The connecting member of claim 2, wherein the two securing members are secured to the ribbon strip.

6. The connecting member of claim 1, wherein the length of the resilient component in the first state is shorter than a length of the cable.

7. The connecting member of claim 1, wherein the resilient component is an extendable coil spring, and the cable is substantially received in the extendable coil spring.

8. A connecting member comprising:
a cable configured to transfer signal, the cable comprising a ribbon strip and two connectors configured to be electronically connected to two electronic components;
a resilient component adapted to be secured to the cable at two ends of the resilient component and adjacent to the two electronic components, wherein the resilient component is an extendable coil spring, and the ribbon strip is substantially received in the resilient component; and
two securing members, wherein the two ends of the resilient component are adapted to be clipped to the two securing members to engage the resilient component to the cable, and each of the two securing members is strip-shaped.

* * * * *